(12) United States Patent
Ghani et al.

(10) Patent No.: US 12,575,577 B2
(45) Date of Patent: Mar. 17, 2026

(54) KNEADING MACHINE FOR FOOD DOUGHS WITH SEALING OF KNEADING TOOLS

(71) Applicant: DIOSNA Dierks & Söhne GmbH, Osnabrück (DE)

(72) Inventors: Hashem Ghani, Osnabrück (DE); Stefan Bensmann, Osnabrück (DE)

(73) Assignee: DIOSNA DIERKS & SÖHNE GMBH

( * ) Notice: Subject to any disclaimer, the term of this patent is extended or adjusted under 35 U.S.C. 154(b) by 484 days.

(21) Appl. No.: 18/124,348

(22) Filed: Mar. 21, 2023

(65) Prior Publication Data

US 2023/0232841 A1      Jul. 27, 2023

Related U.S. Application Data

(63) Continuation of application No. PCT/EP2021/075584, filed on Sep. 17, 2021.

(30) Foreign Application Priority Data

Sep. 21, 2020    (EP) ..................................... 20197259

(51) Int. Cl.
| | |
|---|---|
| *A21C 1/14* | (2006.01) |
| *A21C 1/02* | (2006.01) |
(Continued)

(52) U.S. Cl.
CPC .............. *A21C 1/1415* (2013.01); *A21C 1/02* (2013.01); *B01F 27/807* (2022.01); *B01F 27/85* (2022.01);
(Continued)

(58) Field of Classification Search
CPC ....... A21C 1/02; A21C 1/1415; B01F 27/807; B01F 2035/351
(Continued)

(56) References Cited

U.S. PATENT DOCUMENTS 2,853,345 A * 9/1958 Wilson ..................... F16J 15/52
                                                          384/138
5,028,141 A * 7/1991 Stiegelmann ......... B01F 35/165
                                                          366/288
(Continued)

FOREIGN PATENT DOCUMENTS

| DE | 1 080 076 B | 4/1960 |
|---|---|---|
| DE | 1 757 361 A1 | 4/1971 |
(Continued)

OTHER PUBLICATIONS

Official Communication issued in International Patent Application No. PCT/EP2021/075584, issued on Mar. 21, 2023.
(Continued)

*Primary Examiner* — David L Sorkin

(74) *Attorney, Agent, or Firm* — Keating & Bennett, LLP

(57) ABSTRACT

A kneading machine for food doughs includes a kneading bowl, one or more tool shafts rotatably mounted in a housing, a kneading tool attachable to the tool shaft and insertable into the kneading bowl, and a kneading space, each tool shaft being assigned a seal carrier fixed to the housing and which carries a seal arrangement to seal the tool shaft with respect to the seal carrier, the seal carrier being spaced from the tool shaft by a first gap outside the kneading space and which communicates directly with an escape space for food particles escaping out of the kneading space.

9 Claims, 4 Drawing Sheets

(51) Int. Cl.

| | |
|---|---|
| *B01F 27/807* | (2022.01) |
| *B01F 27/85* | (2022.01) |
| *B01F 27/922* | (2022.01) |
| *F16J 15/34* | (2006.01) |
| *B01F 35/30* | (2022.01) |

(52) U.S. Cl.
CPC ......... *B01F 27/922* (2022.01); *F16J 15/3464* (2013.01); *B01F 2035/351* (2022.01)

(58) Field of Classification Search
USPC .... 366/94, 97, 224, 245, 247, 249, 251, 331
See application file for complete search history.

(56) References Cited

U.S. PATENT DOCUMENTS

| | | | | |
|---|---|---|---|---|
| 5,498,074 A * | 3/1996 | Moller | ..................... | A21C 1/02 366/94 |
| 6,997,597 B2 * | 2/2006 | Drocco | ................... | B01F 35/92 366/94 |
| 12,250,950 B2 * | 3/2025 | Bensmann | ................ | F16P 3/12 |
| 2022/0400689 A1 * | 12/2022 | Hoffmann | ................ | A21C 1/02 |

FOREIGN PATENT DOCUMENTS

| | | |
|---|---|---|
| EP | 0 351 693 A2 | 1/1990 |
| EP | 2 892 405 B1 | 10/2019 |
| JP | 2004-041903 A | 2/2004 |
| WO | 2015/022852 A1 | 2/2015 |

OTHER PUBLICATIONS

English translation of Official Communication issued in International Patent Application No. PCT/EP2021/075584, mailed on Jan. 18, 2022.

Official Communication issued in International Patent Application No. PCT/EP2021/075584, mailed on Jan. 18, 2022.

Official Communication issued in European Patent Application No. 20197259.3, issued on Mar. 15, 2021.

* cited by examiner

-PRIOR ART-        Fig. 2

KNEADING MACHINE FOR FOOD DOUGHS WITH SEALING OF KNEADING TOOLS

CROSS REFERENCE TO RELATED APPLICATIONS

This application claims the benefit of priority to European Patent Application No. 20197259.3 filed on Sep. 21, 2020 and is a Continuation Application of PCT Application No. PCT/EP2021/075584 filed on Sep. 17, 2021. The entire contents of each application are hereby incorporated herein by reference.

BACKGROUND OF THE INVENTION

1. Field of the Invention

The present invention relates to a kneading machine for food doughs.

2. Description of the Related Art

Kneading machines for food doughs, in particular baking doughs, have a kneading bowl of various sizes for dough masses of 100 kg to 1000 kg, into which at least one motor-driven kneading tool can be inserted to carry out the kneading process. The kneading tools are each attached to a vertical tool shaft which is driven. In order to prevent food dough from escaping and entering an interior space that is inaccessible during operation, or even into the tool gearbox, the rotatable shaft is sealed off from the surrounding stationary housing. Conventionally, radial shaft seals or mechanical seals are used for this purpose in the gap between the shaft and housing. However, it cannot be ruled out that dough may penetrate through the seal into the interior, especially during tool counter-rotation. This can damage the bearing of the tool shaft. In addition, it is difficult to clean the interior space.

SUMMARY OF THE INVENTION

Preferred embodiments of the present invention provide kneading machines for food doughs in each of which a risk of dough entering an interior space between a tool shaft and a housing is reduced or minimized.

Accordingly, a kneading machine for food doughs includes a kneading bowl, one or more tool shafts rotatably mounted in a housing, at least one kneading tool attachable to the one or more tool shafts and inserted into the kneading bowl, and a kneading space, each of the one or more tool shafts being assigned a seal carrier fixed to the housing and carrying a seal arrangement to seal the one or more tool shafts with respect to the seal carrier, wherein the seal carrier is spaced apart from the one or more tool shafts by a first gap outside the kneading space and which communicates directly with an escape space for food particles escaping out of the kneading space.

The seal carrier is spaced from the tool shaft by a first gap outside the kneading space and which communicates directly with an escape space for food dough escaping out of the kneading space.

By providing an escape space, dough or food particles escaping from or migrating up the shaft are selectively discharged. This prevents dough or food particles from entering the seal arrangement between the tool shaft and the seal carrier and causing damage and/or contamination.

The term "communicates directly" is understood to mean that the two spaces are in direct communication and there is no other space in between. The dough flows directly from one space to the other.

Preferably, the kneading machine is designed to accommodate dough masses in the range of about 100 kg to about 1000 kg, for example.

Preferably, the escape space is at least partially open at the top and/or freely accessible from the outside for cleaning. The tool seal is particularly suitable for kneading machines with an open concept, in which covers of the machine are largely dispensed with. Preferably, the escape space is located outside the seal arrangement in the radial direction to the axis of rotation of the tool shafts.

Preferably, a second gap is provided between the tool shaft and a portion of the kneading machine that is immovable at least during operation, which gap communicates directly with the kneading space on one side and the escape space on the other side.

In a preferred embodiment, the tool shaft includes an annular sealing body that is detachably or integrally provided with a tool flange of the tool shaft and interacts with the seal assembly to seal the tool shaft from the housing-fixed seal carrier, wherein the first gap is between the sealing body and the housing-fixed seal carrier. The sealing body may be a separate component that sits on and concentrically surrounds the tool flange of the tool shaft. The tool shaft then has a two-piece design. The additional component is made of stainless steel. The sealing body also has the advantage that the sealing arrangement is protected from external damage, for example by a spatula, because it covers the sealing arrangement downward toward the kneading space.

Preferably, a portion that is immovable at least during operation includes a lid that covers the kneading bowl that is open at the top. Preferably, the cover includes a cover plate, which delimits the opening of the cover for the passage of the one or more tool shafts, wherein the second gap in an operating position of the cover plate is between an inner side of the cover plate and an outer side of the sealing body. The second gap is thus between the components fixed to the housing (cover, cover plate) and the sealing body. The cover plate can preferably be moved vertically between an operating position and a cleaning position.

The seal arrangement preferably includes at least one radial shaft seal.

It is advantageous if the second gap is deeper in the vertical direction and farther out in the radial direction to the axis of rotation than the first gap.

Preferably, the kneading machine includes two spiral tools that rotate in opposite directions.

The above and other elements, features, steps, characteristics and advantages of the present invention will become more apparent from the following detailed description of the preferred embodiments with reference to the attached drawings.

BRIEF DESCRIPTION OF THE DRAWINGS

Preferred embodiments of the present invention are explained in more detail below with reference to the drawings. Similar or similarly acting components are designated in the FIGS. with the same reference signs.

DETAILED DESCRIPTION OF THE PREFERRED EMBODIMENTS

Figure 1:
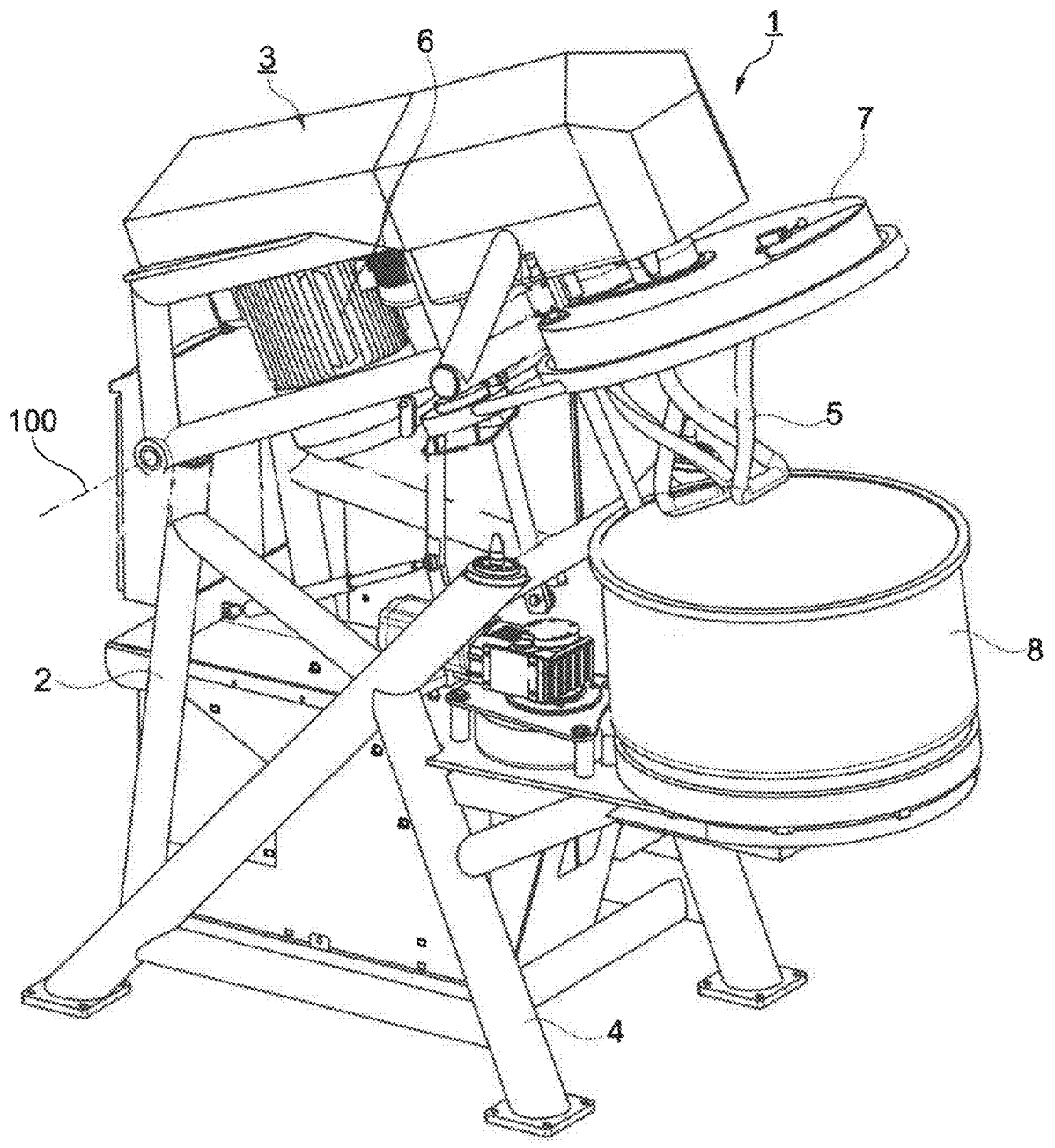
FIG. 1 shows a spatial representation of a kneading machine with kneading bowl in a cleaning position.

FIG. 1 shows a kneading machine 1 for processing a food dough, in particular a baking dough. The kneading machine 1 includes a kneading machine frame 2, the head 3 of which can be pivoted about a pivot axis 100 between a lower operating position and an upper cleaning position relative to a lower portion 4. The head 3 carries the kneading tool 5, shown here are two oppositely rotating spiral kneaders, and the drive 6 required for a rotation of the kneading tool 5, as well as a cover 7 which is provided to cover the kneading bowl 8 which is open towards the top. The kneading machine features an open concept with only a few parts covered.

Figure 2:
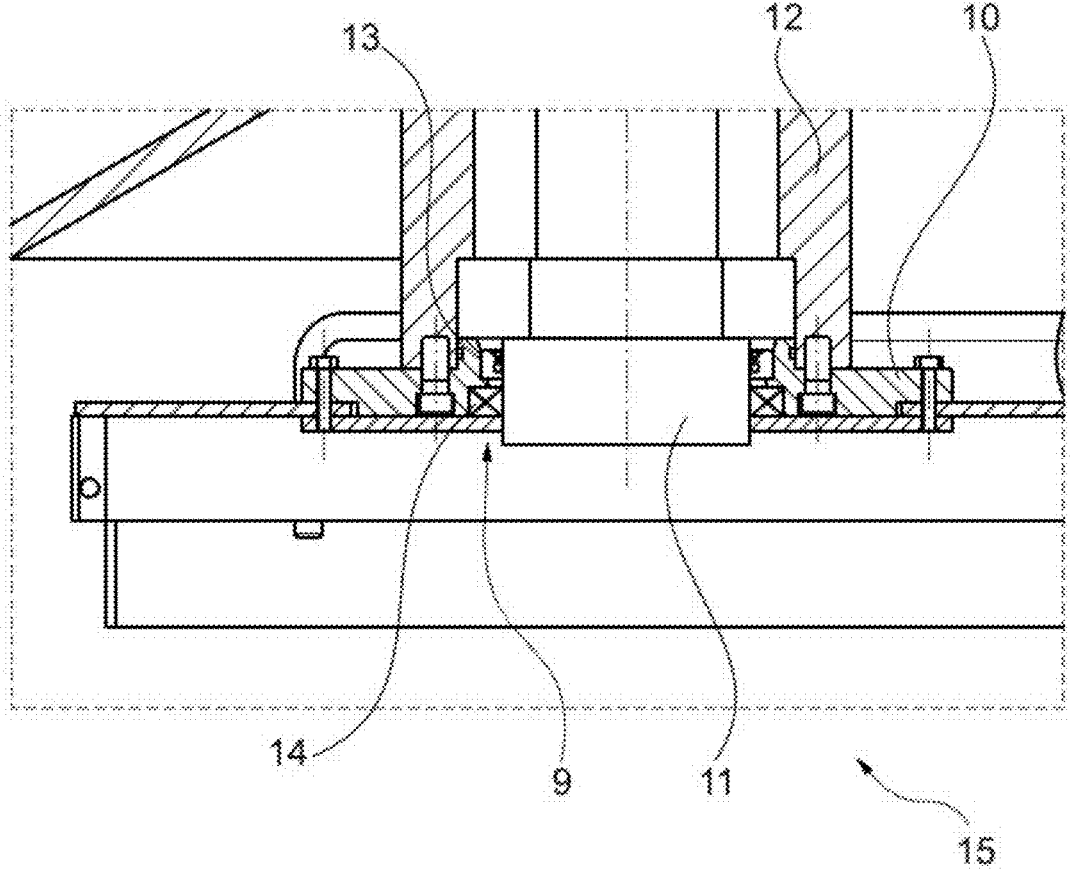
FIG. 2 shows a longitudinal section through a conventional tool sealing device of a kneading machine.

FIG. 2 shows a conventional seal for a tool shaft. A sealing package 9 seals a sealing flange 10 of a tool shaft 11 of the kneading tool against the housing 12. The sealing package has a first shaft seal ring 13 and a second shaft seal ring 14. As mentioned above, such an arrangement has the disadvantage that the gap between the tool shaft 11 and the housing 12 communicates directly with the kneading space 15. Dough can thus pass from the kneading space 15 through the sealing package 9 into the gap and contaminate the area and/or cause damage. The kneading space 15 is the space provided for the kneading process of the kneading machine.

Figure 3:
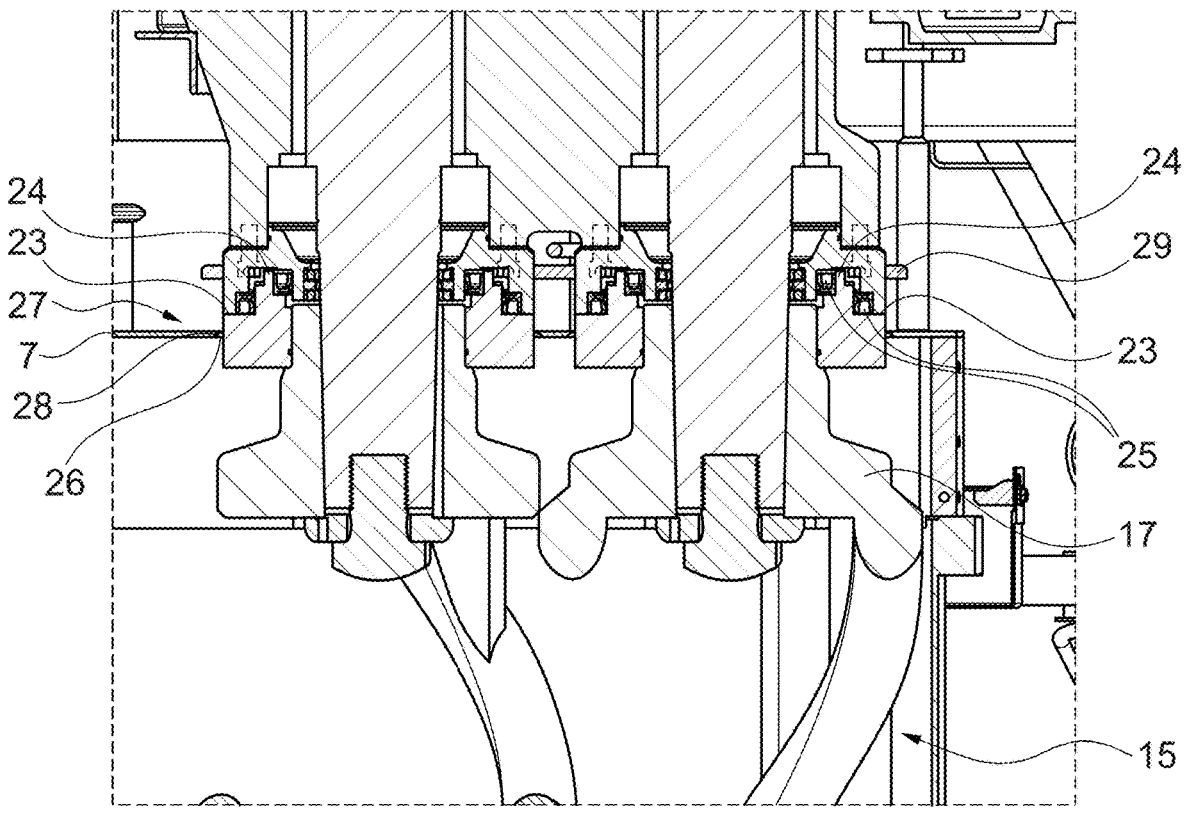
FIG. 3 shows a longitudinal section through a tool sealing device of a kneading machine according to a preferred embodiment of the present invention.
Figure 4:
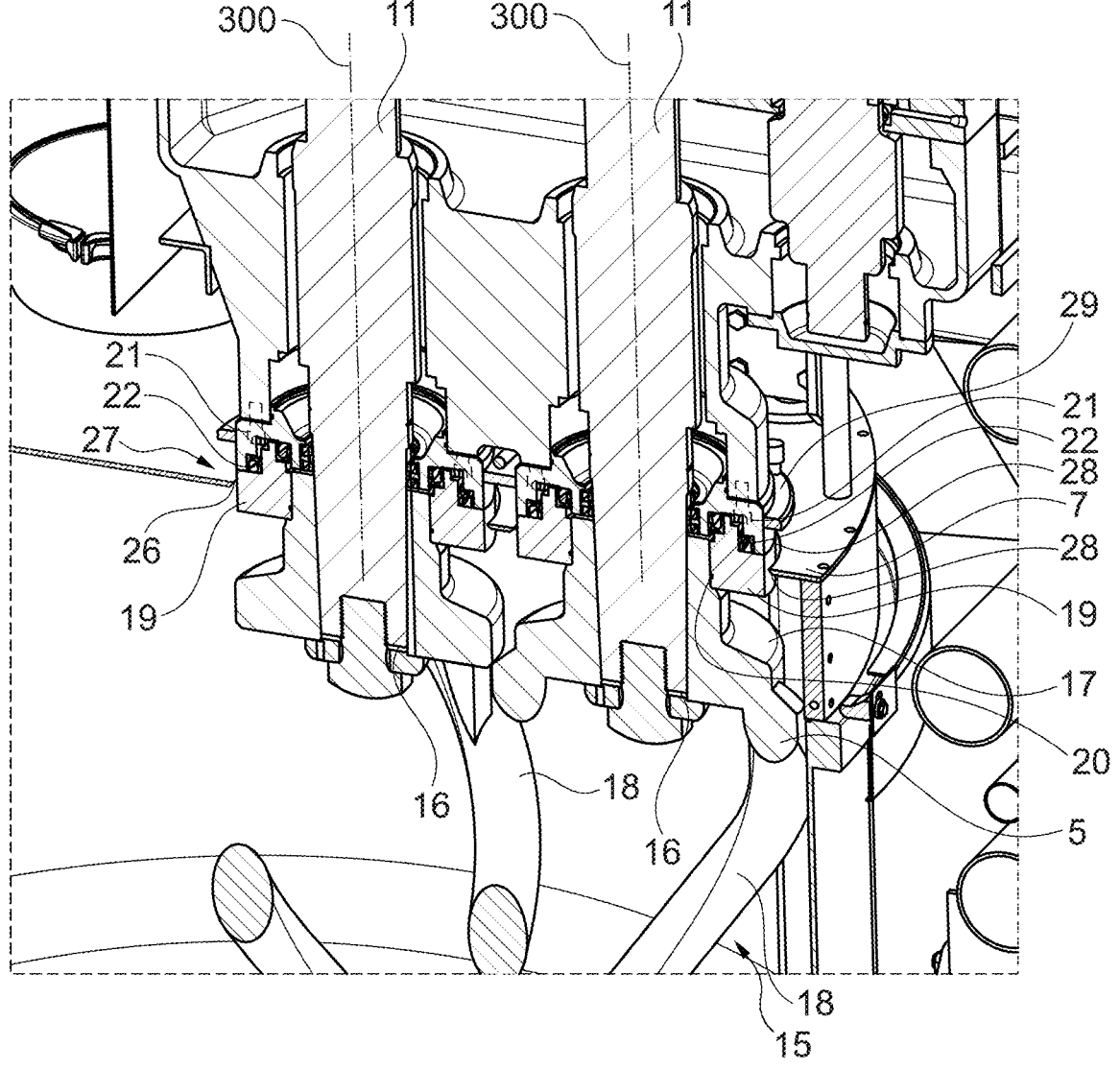
FIG. 4 shows a spatial view of a cutaway view of the tool sealing device shown in FIG. 3.

FIGS. 3 and 4 show a sealing of the kneading tools 5 according to a preferred embodiment of the present invention. The kneading machine 1 includes two tool shafts 11 rotatably mounted in a housing. These are each drivable for rotation about a vertical axis 300 via a drive. The tool shafts 11 include a shaft with an end 16, to each of which a tool flange 17 is attached by a conical seat which is part of the tool shaft 11. The tool flange 17 may be configured such that a helix 18 is detachably attached. A sealing body 19 is seated at the upper end of each of the tool flanges 17, coaxially surrounding the latter and firmly connected thereto. An O-ring 20 is provided between the sealing body 19 and the tool flange 17 to provide sealing. Each tool shaft 11 includes a seal carrier 21 fixed to the housing, which carries a sealing arrangement 22. The seal arrangement 22 seals the seal body 19 or the tool shaft 11 from the space-fixed seal carrier 21. The seal carrier 21 is spaced from the seal body 19 by a first gap 23, in which the seal arrangement 22 is located. A circular protrusion 24 is arranged on the upper side of the seal body 19, with a shoulder on each side. In cooperation with the seal carrier 21, the upper side of the seal body 19 defines a secure seat for the sealing arrangement 22, which includes two shaft sealing rings 25 spaced in the radial direction relative to the axis of rotation 300 of the corresponding tool shaft 11. In the radial direction outwardly, the cover 7 adjoins the sealing body 19 in the operating position. In this case, a second gap 26 is provided between the sealing body 19 and the cover 7 so that the tools can rotate freely. The upper side of the sealing body 19 is located above the lid 7. The second gap 26 is in direct communication with the kneading space 15 and connects the kneading space 15 with an escape chamber 27. The kneading space 15 is provided for the kneading process. If dough escapes or migrates up the tool flange 17 or the tool shaft 11, it creeps past the sealing body 19 to the second gap 26 and enters the escape space 27, where it can spread unhindered. Since the first gap 23 has no direct communication with the kneading space 15, the sealing arrangement 22 remains free of dough that escapes out of the critical area. The escape space 27 is open at the top and can be sighted by the operator due to the open concept of the kneading machine. Cleaning of the escape space 27 is thus also easy.

The openings 28 of the cover through which the tools pass are limited by a cover plate 29 for safety reasons. In FIGS. 3 and 4, the cover plate 29 is shown in an upper cleaning position. For hygiene reasons, the cover plate 29 can be moved vertically for cleaning. The second gap 26 then extends further between the sealing body 19 and the inside of the cover plate 29.

In the vertical downward direction, the second gap 26 is lower than the first gap 23. In the radial direction to the axis of rotation, the second gap 26 is located farther outward than the first gap 23. Such an arrangement can ensure that dough moving upward at the tool does not enter the sealing arrangement, but escapes into the escape space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A kneading machine for food doughs, the kneading machine comprising:
   a kneading bowl;
   one or more tool shafts rotatably mounted in a housing;
   at least one kneading tool attachable to the one or more tool shafts and inserted into the kneading bowl; and
   a kneading space;
   each of the one or more tool shafts being assigned a seal carrier fixed to the housing and carrying a seal arrangement to seal the one or more tool shafts with respect to the seal carrier; wherein
   the seal carrier is spaced apart from the one or more tool shafts by a first gap outside the kneading space and which communicates directly with an escape space for food particles escaping out of the kneading space;
   between the one or more tool shafts and a portion of the kneading machine which is immovable at least during operation, a second gap is provided to communicate directly with the kneading space and the escape space; and
   the second gap is lower in a vertical direction than the first gap, and the second gap is located farther outwardly than the first gap in a radial direction with respect to an axis of rotation.

2. The kneading machine according to claim 1, wherein the escape space is at least partially open at a top.

3. The kneading machine according to claim 1, wherein the escape space is freely accessible from outside.

4. The kneading machine according to claim 1, wherein the one or more tool shafts includes an annular sealing body detachably or integrally provided with a tool flange of the one or more tool shafts and, in interaction with the sealing arrangement, seals the one or more tool shafts with respect to the seal carrier, the first gap being between the sealing body and the seal carrier.

5. The kneading machine according to claim 4, wherein the sealing body is a separate component which is seated on and concentrically surrounds the tool flange of the one or more tool shafts.

6. The kneading machine according to claim 1, wherein a portion that is immovable at least during operation includes a cover covering the kneading bowl which is open towards the top.

7. The kneading machine according to claim 6, wherein the cover includes a cover plate delimiting an opening of the cover for passage of the one or more tool shafts, the second gap being located between an inner side of the cover plate and an outer side of a sealing body.

8. The kneading machine according to claim 1, wherein the sealing arrangement includes at least one shaft seal.

9. The kneading machine according to claim 1, further comprising two helical tools rotating in opposite directions.

\* \* \* \* \*